United States Patent [19]

Boehme et al.

[11] 4,349,897

[45] Sep. 14, 1982

[54] BISTATIC DOPPLER UNDERWATER INTRUSION DETECTION SONAR

[75] Inventors: Hollis Boehme; Garland R. Barnard, both of Austin; Larry L. Mellenbruch, Valle; Danny W. Dickens, Round Rock, all of Tex.

[73] Assignee: The United States of America as represented by the Secretary of the Navy, Washington, D.C.

[21] Appl. No.: 257,068

[22] Filed: Apr. 24, 1981

[51] Int. Cl.³ .................. G01S 15/04; G01S 7/66
[52] U.S. Cl. ..................................... 367/98; 367/94
[58] Field of Search ................. 367/87, 94, 97, 98

[56] References Cited

U.S. PATENT DOCUMENTS

| | | | |
|---|---|---|---|
| 3,111,657 | 11/1963 | Bagno | 340/258 |
| 3,121,856 | 2/1964 | Finney | 340/3 |
| 3,383,678 | 5/1968 | Palmer | 343/5 |
| 3,582,870 | 6/1971 | Peterson et al. | 340/1 |
| 3,740,704 | 6/1973 | Suter | 340/3 D |
| 3,744,015 | 7/1973 | Marimon et al. | 340/3 D |
| 3,878,526 | 4/1975 | Pedersen | 343/7.7 |
| 3,955,171 | 5/1976 | Skoures et al. | 340/3 D |
| 4,206,510 | 6/1980 | Strait | 367/94 |

Primary Examiner—Richard A. Farley
Attorney, Agent, or Firm—Richard S. Sciascia; Harvey A. David

[57] ABSTRACT

A bistatic, Doppler sonar that having a plurality of receiver channels detect intrusion in an insonified water zone processes return signals in a plurality of discrete up Doppler and down Doppler frequencies to effect short and long term averaging of return energy and short and long term averaging of return energy slope prior to sampling and comparison to generate a multiple bit binary word that is periodically updated and read out in parallel form to detection logic. The detection logic utilizes parallel sets of shift register memories and comparators to detect when rates of occurrence of energy, slope, and stroke conditions exceed predetermined rates, and utilizes a plurality of levels of coincidence gates to detect predetermined combinations of such conditions that will produce an alarm initiating signal.

13 Claims, 5 Drawing Figures

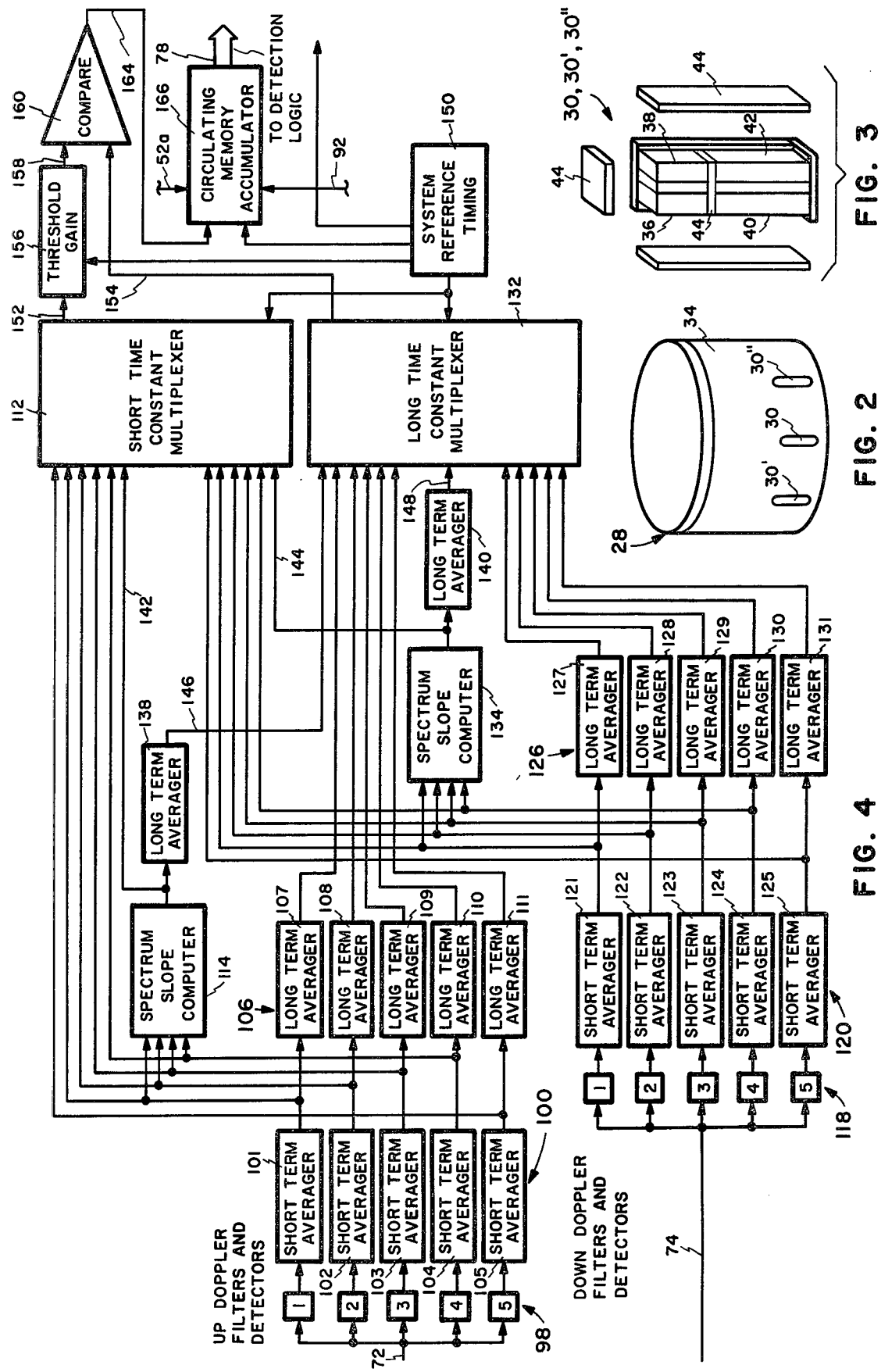

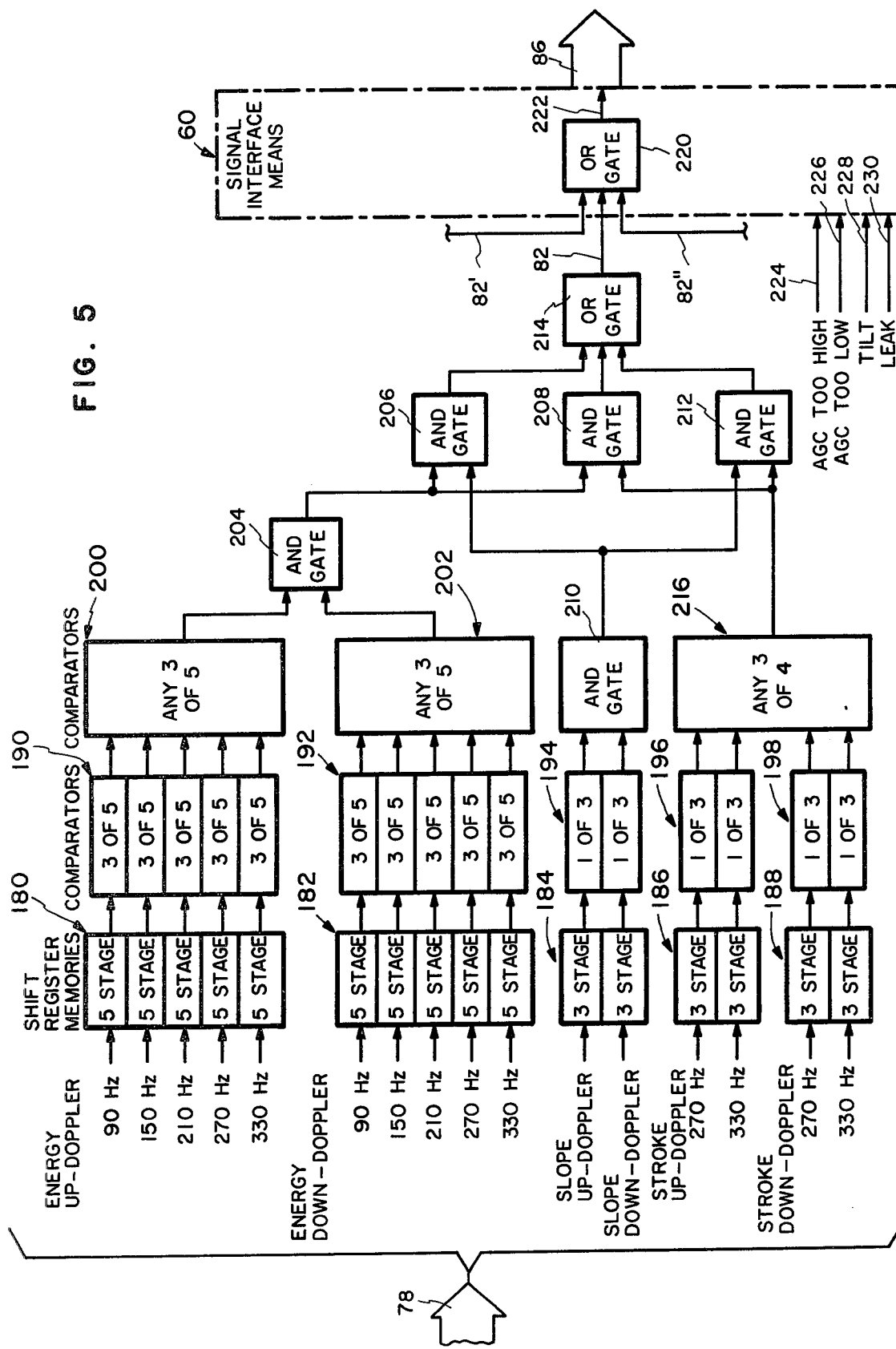

BISTATIC DOPPLER UNDERWATER INTRUSION DETECTION SONAR

BACKGROUND OF THE INVENTION

This invention relates to the field of sonar, and more particularly to sonar apparatus for the detection and classification of intruders into a water zone of interest.

A variety of approaches have been considered for the detection of the presence or intrusion of things or persons into an air or water zone or area of interest. In general, such approaches have either been passive, listening devices or have been active systems that include transmitter means to insonify the zone of interest, and receiver means that detect characteristic changes or disturbances in the insonification signals. When the transmission and receiving means are located at different points in space but share a common insonification region, the system is termed bistatic.

Bistatic intruder detection devices in general rely on motion induced frequency shifts or Doppler effects. U.S. Pat. Nos. 3,111,657; 3,121,856; 3,383,678; 3,582,870; 3,740,704; 3,744,015; 3,878,526; 3,955,171; and 4,206,510 provide examples of Doppler based detection systems. Among the advances taught by those patents are the use of automatic gain control to adjust receiver gain to background noise conditions, the use of plural filters in detection of frequency related returns, the averaging of returns over a period of time, and use of spectral energy content and slope against selected threshhold values. Bistatic sonar detection of intrusion into a building, room, or other air space differs from detection of an intruder in a water zone of concern in numerous respects including but not limited to differences in speed of sound transmission, reverberation, background noise, type and speed of body movements relative to the background, and power considerations. It has been determined, for example, that the strokes of a swimmer or of a wader, or a small boat paddler, produce Doppler variations concentrated at the higher end of the range of frequencies expected. This fact is taken advantage of by the invention to achieve a more certain logic classification and lower false alarm rate.

Among the shortcomings of existing systems for detection of an intruder into a water zone of interest are low assurance of detection of certain intruder characteristics, high false alarm rate, uneven area or volume coverage, high installation and maintenance costs, and a need for skilled and attentive operators.

SUMMARY OF THE INVENTION

With the foregoing in mind, it is a principle object of this invention to provide a novel and improved intrusion detection system of the bistatic sonar type particularly useful in maintaining surveillance over a water zone of interest and providing reliable indication or alarm when a wader, swimmer, or other intruding entity enters the protected zone.

Another object is to provide such a system that yields greater reliability of intruder detection yet affords the capability of lower false alarm rates, and requires attendance by relatively unskilled operators.

Yet another object is the provision of an intrusion detecting sonar system that is readily adapted to provide a prolonged barrier line for protection of an extended zone of protection.

As another object the invention aims to provide, in a bistatic, Doppler sonar system for detection of swimmers, waders, small craft, and the like, improved signal processing and detection logic that cooperate to initiate an alarm in response to certain changes in return energy, spectrum slope, and intruder stroke generated noise.

A still further object is to provide the above mentioned hydrophones with a selectively variable vertical width beam capability, whereby each unitary receiver portion can be conditioned during installation to have a receiving beam vertical dimension that is most effective for the depth of water where the receiver is being installed.

A further object is the provision of a sonar system of the foregoing character wherein the unitary receiver portion comprises a plurality of parallel receiver channels served by a like plurality of hydrophones, each having a predetermined receiving beam pattern and being mounted on a housing so as to effect a combined receiving pattern covering a predetermined zone of surveillance, and the housing providing watertight protection for the receiver channel electronics, whereby the system is responsive to intrusion into one or more of the individual beam patterns, and a plurality of such unitary receiver portions are adapted to be deployed in an array to establish perimeter warning line.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 2 is a perspective view of a unitary receiver portion of the sonar system of FIG. 1;

FIG. 3 is a perspective view, on an enlarged scale and with some parts pulled away, of a hydrophone forming part of the receiver portion of FIG. 2;

FIG. 4 is a block diagram illustrating in greater detail the signal processing circuit forming part of the system of FIG. 1; and FIG. 5 is a block diagram illustrating in greater detail the detection logic portion of the system of FIG. 1.

Referring now to FIG. 1, a bistatic sonar system embodying the invention is indicated generally at 10 and comprises acoustic transmitter means 12 for insonifying a water zone to be kept under surveillance with a continuous wave (CW) carrier frequency $f_c$ determined by a stable local oscillator 14 forming part of a shore station. The shore station oscillator serves as a reference frequency signal source and is coupled by cable 16 to the transmitter means 12 which comprises a transmit frequency lock 18, conveniently in the form of phase lock loop means. The latter serves to reconstitute the reference frequency signals that may undergo considerable attenuation when the cable 16 is of great length, and to drive, via line 20 a power amplifier 22 at frequency $f_c$. The output of the power amplifier is fed, as indicated by line 24 to a wide angle acoustic projector 26 for insonifying the water zone of concern. In the instant example, the frequency $f_c$ is 195 kHz.

A barrier line comprising one or more receiver units may be established about the water zone of concern. Each receiver unit 28 comprises a plurality of hydrophones 30, 30', and 30", characterized by a receiving beam pattern of about 40° width between −3 db points and serving a corresponding individual receiver channel 32, 32′, 32″. In the presently preferred embodiment there are three such hydrophones and channels. Referring to FIG. 2, the receiver unit 28 comprises a watertight, cylindrical housing 34 for the electronics of the three receiver channels 32, 32′, 32″ and has the hydrophones 30, 30′, 30″ recessed in the exterior side wall thereof and spaced at predetermined angular intervals, here, 45°. Referring to FIG. 3, each hydrophone comprises two sets of piezoelectric elements, one set 36, 38 is short in height, say 1.0 inch, relative to the other set 40, 42 which are 1.57 inch in height. The elements are separated from one another and from the receiver housing by spacers 44 of a material such as that sold under the name "CORPRENE". The sets of elements are adapted to be selectively connected so that one, the other, or both sets to form receiving beams that are of a vertical height more or less commensurate with the depth of water in the zone to be under surveillance.

Figure 1:
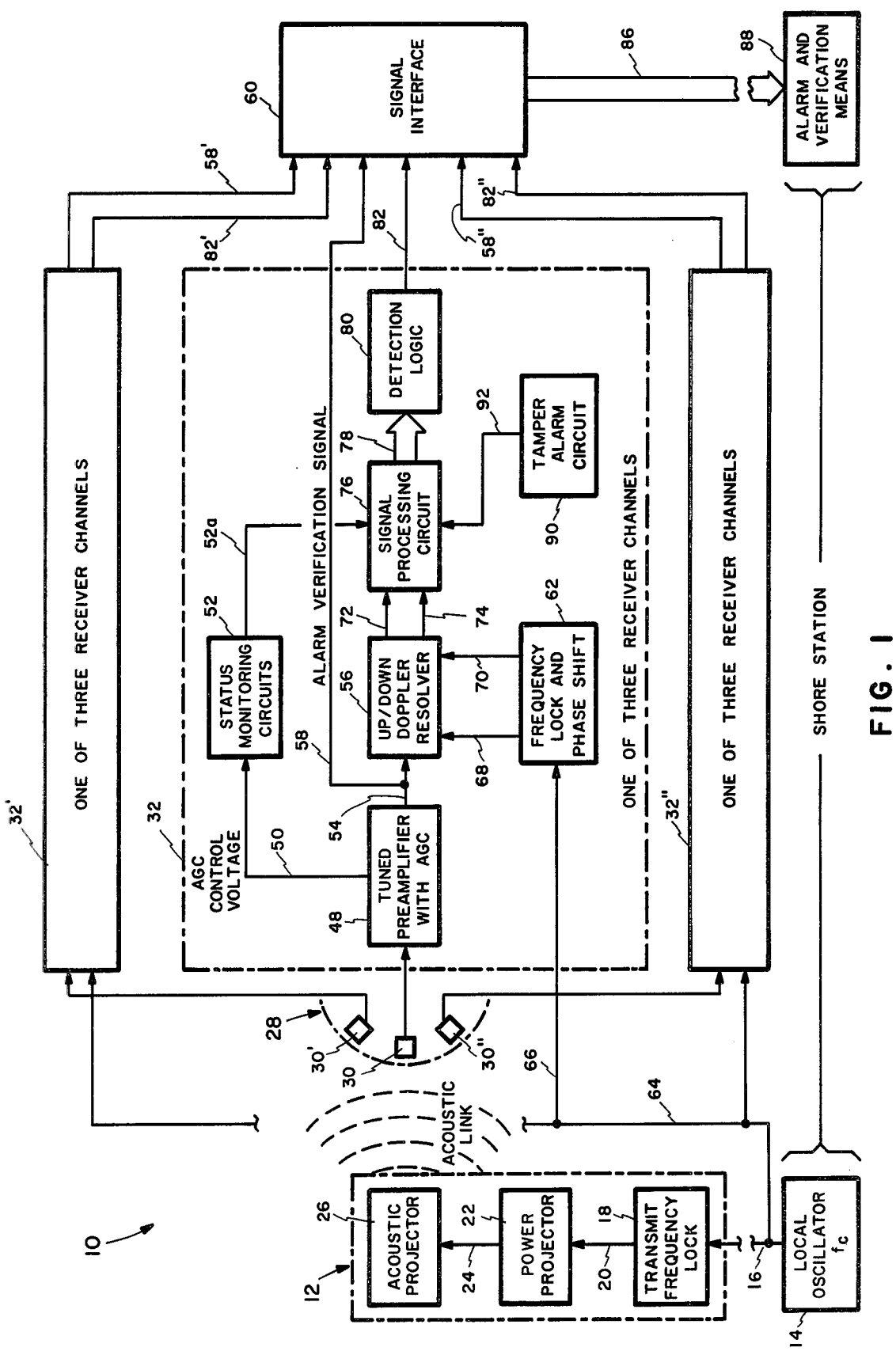
FIG. 1 is a diagrammatic illustration, in block form, of an intrusion detection bistatic sonar system embodying the present invention.

Reverting to FIG. 1, the hydrophones 30, 30′, 30″ receive acoustic energy in a frequency band centered at the carrier frequency and including frequencies near the carrier frequency. Each channel 32, 32′, 32″ comprises a tuned preamplifier 48 for amplifying the signals received by the hydrophone and which may vary in level over a 90 dB dynamic range. The preamplifier 48 includes an automatic gain control to reduce the overall dynamic range of preamplifier output signals which must be processed within the receiver electronics. The AGC sets the preamplifier gain with reference to the received background so as to preserve a usable 40 dB dynamic range.

The automatic gain control voltage is also applied, as shown by line 50, to a status monitoring circuit 52 for a purpose which will presently be made apparent.

The output of the preamplifier 48 is applied, as shown by line 54, to an up/down doppler resolver 56, and by line 58 to a signal interface means 60. A frequency lock and phase shift means 62 receives the reference frequency output of the shore station local oscillator 14 as shown by lines 16, 64, and 66. Therein, a phase lock loop reproduces the reference frequency $f_c$, and a quadrature phase shifted version thereof is produced. The direct and quadrature versions of $f_c$ are applied as shown by lines 68 and 70 to the resolver 56. The preamplifier output is mixed with the direct and quadrature versions of the reference frequency in the resolver to produce up Doppler and down Doppler signals, represented by lines 72, 74, respectively, for application to a signal processing circuit 76.

The signal processing circuit 76, later described in detail with reference to FIG. 4, processes the up Doppler and down Doppler inputs to derive periodically updated values representative of return energy, spectral slope, and stroke content. These values, in binary digital form, are applied as shown by line 78 to a detection logic means 80 for interpretation and generation of a predetermined output, line 82, to occur when certain parameters of energy, spectral slope and stroke content are met for returns received by the hydrophone 30 for that one of three receiver channels.

The outputs 82, of the channel 32 being described, and 82′ and 82″ of channels 32′, 32″, are fed, along with alarm verification audio signals, lines 58, 58′, 58″ to the signal interface means 60. The signal interface means correlates the received signals for transmission by cable, represented by line 86 to alarm and verification means 88 of the shore station. A tamper alarm circuit 90, including for example, tilt and leak detectors, is connected via line 92 to the signal processing circuit.

Turning to FIG. 4, the signal processing circuit 76 of the typical channel 32 comprises a first bank 98 of five, parallel, frequency band-pass filters and detector units to which the up Doppler input 72 from resolver 56 is applied. The filter and detector units 1-5 of bank 98 are each about 20 Hz wide and are tuned to center on frequencies of 90 Hz, 150 Hz, 210 Hz, 270 Hz, and 330 Hz, respectively. The outputs of the bank 98 are applied to a bank 100 of short term averages 101-105 which have time constants of 200 ms for averagers 101 and 102, and 100 ms for averagers 103-105. These constants are selected to preserve the motion characteristics of underwater intruders. The outputs of the five short term averagers 101-105 are applied to bank 106 of five long term averagers 107-111, each having a time constant of about 50 seconds, and also to a first multiplexer 112. The first four of the short term averagers 101-104 have their outputs fed also to a spectrum slope computer 114.

Similarly, the signal processing circuit 76 comprises a second bank 118 of five, parallel, frequency band-pass filter and detector units to which the down Doppler input 74 from resolver 56 is applied. The filter and detector units 1-5 of the bank 118 are identical to the corresponding filter and detector units of bank 98, and the outputs thereof are applied to a bank 120 of five short term averagers 121-125 which are identical to averagers 101-105 of bank 100. The outputs of the latter are applied to a bank 126 of five long term averagers 127-131, and also to a second multiplexer 132. The outputs of the first four short term averagers 121-124 are fed also to a spectrum slope computer 134.

The inputs to the spectrum slope computers 114 and 134 are weighted and summed to provide short term weighted sum outputs to long term averagers 138 and 140, respectively, as well as to the multiplexer 112 as shown by lines 142, 144. The long term averagers 138, 140 have a time constant of 500 ms, and the outputs thereof are applied to the multiplexer 132 along with the outputs of the other long term averagers, as shown by lines 146, 148.

The outputs of the long term averagers are proportional to the corresponding filter outputs or spectrum slope computer output standard deviations and provide threshold references which track slowly varying background noise levels. The outputs of all of the short term averagers 101-105 and 121-125 for all five filters of each bank 98 and 118, and the outputs of the spectrum slope computers 114, 134 are sampled and entered into the multiplexer 112 at a rate of about 30 Hz, under the control of a system reference timing signal source 150. Similarly, the outputs of the long term averagers 107-111, 127-131, 138, and 140 for the down Doppler sideband are sampled and entered into the multiplexer 132 under control of the system reference timing signal source 150. The multiplexers 112, 132 are strobed to provide simultaneous outputs of corresponding short and long term averaged samples as shown by lines 152, 154. A threshhold gain circuit 156, also under the control of the system reference timing source 150, applies a weighting factor to each short term averaged sample on line 152 to provide weighted short term averaged samples via line 158 as one input to a comparator 160. The corresponding long term averaged samples, line 154, serve as the reference input to the comparator 160 and, as mentioned earlier, are representative of slowly changing background noise conditions. With each strobed output of the multiplexers 112, 132, the comparator 160 provides an output, as shown by line 164, that constitutes a logical "1" if the weighted short term average sample exceeds the corresponding long term average sample. Otherwise, a logical "0" is present. The logic level at the output 164 of comparator 160 is entered into a recirculating memory 166 and accumulated therein to form a portion of a 64 bit word that represents the state of the energy, spectrum slope, and stroke conditions for both Doppler sidebands of all three receiver channels at a particular sampling time.

Sixteen bits of the 64 bit word are used for each of the three receiver channels corresponding to the three hydrophones 30, 30', 30'', or a total of 48 bits. The remaining 16 bits are available for auxiliary circuits such as the monitoring circuits, tamper circuits, and the like. Inputs from the monitoring circuit via line 52a and from the tamper circuit via line 92 are sampled under the control of the timing reference signal source and entered as part of the 64 bit recirculating word. The 64 bit word is changed whenever the comparator output logic level for a unique address within the word exceeds the logic level at that address in the memory 166. At the end of one second, the then existing 64 bit word it output to the detection logic circuit 80, as indicated by arrow 78, and the logic levels at all addresses of the 64 bit word are reset to zero. The process is then repeated for the next one second period.

Referring now to FIG. 5, the receiver detection logic 80 comprises a first shift register memory 180 comprising a set of five, parallel, 5 state shift registers, each adapted to receive as input the 64 bit word logic bits that correspond to an energy condition of one of the five up Doppler filter frequencies. Since each of these shift registers has five stages, through which the logic bits are clocked at one stage per second, each up Doppler energy logic bit is retained in the memory 180 for 5 seconds. When a new logic bit is entered, the oldest bit is discarded.

A second five second shift register memory 182 comprises five, parallel, five stage shift registers for receiving logic bits of the 64 bit word that correspond to the energy conditions of the five down Doppler filter frequencies.

A first three second shift register memory 184 comprises two, parallel, three stage shift registers adapted to receive the 64 bit word logic bits representing the up Doppler slope and the down Doppler slope outputs of the spectrum slope computers 114 and 134. Second and third three second shift register memories 186 and 188 each comprise two, parallel, three stage shift registers adapted to receive the 64 bit word logic bits corresponding to the up Doppler filter frequencies and the two down Doppler filter frequencies used for swimmer stroke detection.

The logic circuit 78 comprises comparator means for analyzing the content of each of the shift registers of the foregoing shift register memories 180, 182, 184, and 188 after each 1 second update period. Thus, sets 190 and 192 of five 3 of 5 comparators serve to interrogate and analyze the contents of the shift registers of energy memories 180, 182. Sets 194, 196, and 198 of two 1 to 3 comparators serve to interrogate and analyze the contents of the slope memory 184, and the stroke memories 186, 188.

For the energy processing, reference levels of the comparator sets 190 and 192 are selected so that a logic level "1" at any 3 of the 5 memory positions of a shift register will result in a logic "1" output of the corresponding comparator. The outputs of all five comparators of the up Doppler sideband comparator set 190 are strobed once per second and input to an any 3 of 5 comparator 200. Likewise the outputs of all five comparators of the down Doppler sideband comparator set 192 are strobed once per second and input to an any 3 of 5 comparator 202. The reference levels of the final comparators 200, 202 are set so that a logic level "1" at any three of the preceding comparator outputs will result in a logic level 37 1" at the corresponding input of an AND gate 204. If the outputs of both of the final comparators 200 and 202 for the up and down Doppler sidebands are logic "1" simultaneously for any given second, a logic "138 is present at the output of AND gate 204 and applied to one input of each of the top two second stage AND gates 206 and 208. No alarm signal will result, however, unless another logic "1" is present as the other input to one or the other of the gates 206, 208.

For the spectrum slope processing, one of two 3 stage shift registers of the three second memory 184 is used for Doppler sideband. These registers are updated once per second and the oldest information dropped at each update. The two comparators of set 194 have their reference levels set so that a logic "1" at any 1 of the three stages of either shift register will result in a logic "1" on one of the two inputs to an AND gate 210. If both of the inputs to the AND gate 210 are a logic "1", that gate will provide a logic "1" output as a second input to AND gate 206 and as a first input to an AND gate 212. If that input to AND gate 206 coincides with a logic "1" to the other input thereof, AND gate 206 will produce a logic "1" output to an OR gate 214 calling for an alarm.

For the stroke processing, the two parallel 3 stage shift registers of the 3 second memory 186 are used for the two filter frequencies of the up Doppler sideband, while the two parallel 3 stage shift registers of the 3 second memory 188 are used for the two filter frequencies of the down Doppler sideband. Again, the four shift registers are updated once each second by an appropriate bit of the 64 bit word from the accumulator 166, with the oldest data bits being discarded. The two comparators of each set 196 and 198 are set so that logic "1" at any of the three memory positions of the corresponding shift register will result in a logic "1" at the associated comparator output. The four outputs of the comparator sets 196 and 198 are fed to an any 3 of 4 comparator 216, the reference levels of which are set to result in a logic "1" output whenever three of the four inputs are logic "1". The output of the comparator 216 is applied as another input to each of the AND gates 208 and 212. Upon coincidence of a logical "1" output of comparator 216 and of AND gate 204 from the energy processing, AND gate 208 will provide a logic "1" output to OR gate 214 calling for an alarm. Also, upon coincidence of a logical "1" output of comparator 216 and of AND gate 210 from spectral slope processing, AND gate 212 will provide a logic "1" output to OR gate 214 calling for an alarm. A logical "1" thus applied to any of the three inputs of OR gate 214 will result in that gate providing a logical "1" output, line 82 to the signal interface means 60. Accordingly, it will be seen that, at the level of AND gates 206, 208, and 212, any two of the three processing categories of energy, spectral slope, and stroke can initiate an alarm for one of the three receiver channels 32, 32', 32".

The outputs 82, 82', and 82" of the three channels 32, 32', 32" are applied to an OR gate 220 forming part of the signal interface means 60 which provides an appropriate signal output 222 forming part of the line 86 to the shore station to alarm and verification means at the shore station.

Lines 224, 226 represent data bits of the 64 bit word pertaining to the status monitoring circuits 52. The status monitoring circuits allow the detection and indication of conditions which result in degraded acoustic receiver performance. The preamplifier AGC voltage level is monitored and compared against both high and low reference limits. If a high energy level, broad-band source is brought near enough to the receiver to degrade receiver performance, the AGC voltage will exceed the high level limit and an alarm signal is ititiated. If the projector or receiver is masked such that reverberation background is significantly reduced, the AGC voltage will fall below the lower voltage limit and an alarm signal is initiated. If the reference frequency is lost or becomes unstable to the point that frequency lock is lost, an alarm signal is also initiated.

The tamper alarm circuits 90 are included to detect attempts to remove or reorient the receivers or attempts to defeat receiver operation by flooding the receiver electronics housing. Thus, a tilt and vibration sensor is included, as is a leak detector responsive to flooding or accumulation of moisture, for initiating an alarm via lines 228, 230, whenever those conditions are sensed.

Verification is accomplished, if desired, by trained personnel listening to audio signals brought via lines 58 to the signal interface means, and thence as part of line 86 to the shore station.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A bistatic sonar system for detecting intrusion into a predetermined zone of a body of water, said system comprising:
a source of a reference frequency;
fixed, continuous wave transmitter means, responsive to said reference frequency, for insonification of said zone with acoustic energy at a predetermined frequency;
fixed receiver means including hydrophone means, separately disposed from said transmitter means, for receiving acoustic signals from said zone and providing corresponding electrical signals as an output;
automatic gain controlled amplifier means, responsive to said hydrophone means, for amplifying target return signals with a gain that is varied in response to slowing changing background noise;
up and down Doppler resolver means, responsive to said reference frequency and to the output of said amplifer means, for providing target signal containing up Doppler and down Doppler sideband frequencies;
signal processing means, responsive to said up Doppler and down Doppler sideband frequencies, for effecting filtering and detection of signals at a plurality of fixed bandpass frequencies within said sideband frequencies and for repetitively providing a multiple bit binary word representative of samples of a plurality of detected return signal conditions including energy, spectral slope, and stroke content;
logic means, responsive to predetermined combinations of rates of occurrence of word bit binary levels, for generating a utilization initiating signal; and
utilization means, responsive to said utilization initiating signal, for effecting a predetermined utilization function.

2. A bistatic sonar system as defined in claim 1, and wherein said signal processing means comprises:
a plurality of parallel, filter and detector means for detecting signals within a plurality of frequency passbands for each Doppler sideband;
a plurality of first averager means for effecting short term averaging of signals detected in each frequency passband of each Doppler sideband;
a plurality of second averager means for effecting long term averaging of signals detected in each frequency passband of each Doppler sideband;
first multiplexer means for sampling the outputs of said first averager means and serializing the samples thereof;
second multiplexer means for sampling the outputs of said long term averager means and serializing the samples thereof;
comparator means, responsive to said serialized samples from said first and second multiplexers, for generating a series of binary data bits representative of relative signal content of said samples derived from said Doppler sidebands; and
memory means for assembling said series of binary data bits into said binary word and periodically reading said word out in parallel outputs of said data bits, each such output being representative of one of said conditions of energy, spectral slope, or stroke content.

3. A bistatic sonar system as defined in claim 2, and wherein said logic means comprises:
a plurality of plural stage shift registers each register being adapted to periodically receive data bits from one of said parallel outputs for periodic shifting through the stages thereof;
a like plurality of register data comparators, each associated with a corresponding one of said shift registers, said register data comparators each being characterized by binary reference levels so selected that the comparator produces a predetermined binary output upon a predetermined number of occurrences of predetermined binary data bits in said corresponding register.

4. A bistatic sonar system as defined in claim 3, and wherein said signal processing means further comprises:
first and second slope computer means, responsive respectively to the up Doppler and down Doppler outputs of a plurality of said first averager means, for differentiating the outputs thereof to provide short term slope detected outputs for each of said Doppler sidebands as inputs to said first multiplexer means; and
first and second additional averager means for providing long term averaging of said slope detected outputs as inputs to said second multiplexer means.

5. A bistatic sonar system as defined in claim 4, and wherein said logic means further comprises:

AND gate means, responsive to coincidences of predetermined pairs of outputs of said register data comparators, for providing said utilization initiating signal.

6. A bistatic sonar system as defined in claim 5, and wherein:

said system includes shore station means including said source of a reference frequency;

said transmitter means is disposed remotely from said shore station and comprises power amplifier means, for driving an acoustic projector means;

acoustic projector means, driven by said power amplifier means, for effecting said insonifying of said water zone; and phase lock means, responsive to said reference frequency signal, for providing a reference frequency stabilized transmit frequency signal to said power amplifier means irrespective of reference frequency attenuation between said shore station and said transmitter means.

7. A bistatic sonar system as defined in claim 6, and wherein:

said receiver means comprises a watertight housing;

said hydrophone means comprises a plurality of hydrophones mounted in an azimuthal array on said housing; and each of said hydrophones comprising an assembly of vertically long and short piezoelectric elements selectively operable alternatively or in unison whereby the vertical pattern of receiving response is adapted to be selected in accordance with depth of water in said zone.

8. A bistatic sonar system as defined in claim 6, and further comprising:

status monitoring means, responsive to automatic gain control voltage conditions of said amplifier means, for generating predetermined binary outputs to said signal processing means and corresponding to increase or decrease of background noise above or below predetermined levels as by subjecting said hydrophone means to masking or to jamming signals.

9. A bistatic sonar system as defined in claim 7, and wherein:

said receiver means comprises a plurality of receiving channels each associated with one of said hydrophones, and signal interface means, responsive to a utilization initiating signal from any of said channels to effect actuation of said utilization means.

10. A bistatic, Doppler sonar system including a projector for insonifying a water zone with continuous wave acoustic energy centered at a predetermined carrier frequency, a multiple channel receiver for receiving return signals from said zone at frequencies including said carrier frequency and Doppler shifted sidebands thereof and operative to form alarm initiating signals when the return signals include detected energy, time, and frequency characteristics representative of an intrusion into said zone, each receiver channel comprising:

a hydrophone;

an automatic gain controlled preamplifier connected to amplify outputs of said hydrophone;

resolver means, responsive to direct and quadrature forms of said carrier frequency and to said return signals, for providing outputs representative of up Doppler and down Doppler frequencies;

pluralities of first and second filter and detector units for detecting return signals at corresponding pluralities of discrete up Doppler and down Doppler frequencies, respectively;

a plurality of first and second short term averagers connected to provide short term averages of the return signals detected by said first and second sets of filter and detector units, respectively;

a plurality of first and second long term averagers connected to provide long term averages of the return signals detected by said first and second sets of filter and detector units, respectively;

first and second slope computing means, responsive to a portion of said short term averages of said first and second short term averagers, respectively, for providing first and second slope representing signals;

first and second additional long term averagers for providing long term averages of each of said slope representing signals;

first and second multiplexers for respectively sampling said long and short term averages to form first and second series of samples representative thereof;

a comparator for comparing said samples of said first and second series to provide a series of binary data bits representative thereof;

a recirculating memory for converting said series into a periodically recirculating multiple bit binary word, and for periodic reading out of said word in parallel bit form;

first, second, third, fourth and fifth pluralities of parallel accumulator and comparator means, responsive to said periodic parallel bit readout, for providing a plurality of outputs each representative of presence or absence of a predetermined frequency of occurrence of a predetermined return signal condition corresponding to presence or absence of an intrusion;

a plurality of coincidence gate means, responsive to predetermined combinations of said accumulator and comparator means outputs to provide an intrusion signal.

11. A bistatic, Doppler sonar system as defined in claim 10, and wherein: said multiple channel receiver comprises three of said receiver channels.

12. A bistatic, Doppler sonar system as defined in claim 11, and wherein:

said pluralities of discrete up Doppler and down Doppler frequencies comprise about five of said up Doppler frequencies and about five of said down Doppler frequencies; and said pluralities of first and second short and long term averagers and said first and second pluralities of accumulator and comparator means correspond in numbers to said up and down Doppler frequencies, respectively, and receive work bit inputs representative of energy of said return signals at said discrete frequencies.

13. A bistatic, Doppler sonar system as defined in claim 12, and wherein:

said third plurality of accumulator and comparator means comprises two such means and receive word bit inputs representative of said slope computer outputs; and said fourth and fifth pluralities of accumulator and comparator means each comprise two such means that receive word bit inputs representative of energy of return signals at predetermined pairs of said up Doppler and said down Doppler frequencies characteristic of intruder stroke movements.

* * * * *